(12) United States Patent
Neubauer (10) Patent No.: US 9,733,021 B2
(45) Date of Patent: Aug. 15, 2017

(54) PULLING ROLLS FOR MAKING SHEET GLASS AND METHODS OF MAKING AND USING

(71) Applicant: Corning Incorporated, Corning, NY (US)

(72) Inventor: Dean Veral Neubauer, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 213 days.

(21) Appl. No.: 14/611,794

(22) Filed: Feb. 2, 2015

(65) Prior Publication Data

US 2015/0143698 A1    May 28, 2015

Related U.S. Application Data

(62) Division of application No. 12/829,685, filed on Jul. 2, 2010, now abandoned.

(51) Int. Cl.
| | | |
|---|---|---|
| *F27D 19/00* | (2006.01) | |
| *C03B 17/06* | (2006.01) | |
| *B29D 99/00* | (2010.01) | |

(52) U.S. Cl.
CPC ......... *F27D 19/00* (2013.01); *B29D 99/0035* (2013.01); *C03B 17/068* (2013.01); *Y10T 29/49549* (2015.01); *Y10T 29/49554* (2015.01)

(58) Field of Classification Search
CPC .... F27D 19/00; C03B 17/068; B29D 99/0035
See application file for complete search history.

(56) References Cited

U.S. PATENT DOCUMENTS

| | | | |
|---|---|---|---|
| 1,594,417 A | 8/1926 | Kobbe | 106/76 |
| 1,678,345 A | 7/1928 | Mattison | |
| 3,149,949 A | 9/1964 | Dockerty et al. | 65/53 |
| 3,334,010 A | 8/1967 | Moore | 106/99 |
| 3,338,696 A | 8/1967 | Dockerty | 65/145 |
| 3,355,275 A | 11/1967 | Sensi et al. | |
| 3,642,505 A | 2/1972 | Bakker | |
| 3,682,609 A | 8/1972 | Dockerty | 65/83 |
| 3,763,533 A | 10/1973 | Blom et al. | 29/132 |
| 4,397,673 A | 8/1983 | Stevens | 65/374.11 |
| 4,487,631 A | 12/1984 | Britt et al. | 106/80 |
| 4,533,581 A | 8/1985 | Asaumi et al. | 428/64 |

(Continued)

FOREIGN PATENT DOCUMENTS

| | | |
|---|---|---|
| CN | 101553666 A | 10/2009 |
| DE | 19504044 A | 9/1995 |

(Continued)

OTHER PUBLICATIONS

Third Party Submission in Japanese Patent Application No. 2013-518706, submission document filed Jul. 24, 2014, author anonymous.

(Continued)

*Primary Examiner* — Jacob Cigna
(74) *Attorney, Agent, or Firm* — Jeffrey A. Schmidt (57) ABSTRACT

A pulling roll for glass manufacture made from a millboard material fired to minimize or eliminate weight loss during operation. Methods for preparing and using such a pulling roll are also disclosed.

12 Claims, 1 Drawing Sheet

(56) References Cited

U.S. PATENT DOCUMENTS

| | | | |
|---|---|---|---|
| 5,989,170 A | 11/1999 | Hart et al. | 492/48 |
| 6,896,646 B2 | 5/2005 | Kaiser et al. | 492/40 |
| 7,284,328 B2 | 10/2007 | Kaiser | 29/895.21 |
| 7,507,194 B2 | 3/2009 | Neubauer et al. | 492/40 |
| 2004/0220032 A1 | 11/2004 | Nakayama et al. | 492/40 |
| 2005/0268657 A1 | 12/2005 | Adamowicz et al. | 65/53 |
| 2005/0268658 A1 | 12/2005 | Adamowicz et al. | 65/53 |
| 2008/0120995 A1* | 5/2008 | Neubauer | C03B 17/068 65/33.7 |
| 2012/0004084 A1 | 1/2012 | Neubauer | |

FOREIGN PATENT DOCUMENTS

| | | |
|---|---|---|
| JP | 9/301765 | 11/1997 |
| JP | 2005/520774 A | 7/2005 |
| JP | 2009132619 A | 6/2009 |
| JP | 2010/510956 | 4/2010 |
| JP | 2013/531607 | 8/2013 |
| TW | 200844059 A | 11/2008 |
| WO | 99/28690 | 6/1999 |
| WO | 03/082755 A1 | 9/2003 |
| WO | 2008/066660 | 6/2008 |
| WO | 2009/134413 | 11/2009 |
| WO | 2012003312 A2 | 5/2012 |

OTHER PUBLICATIONS

International Searching Authority; International Search Report for International Application No. PCT/US2011/042588; Feb. 17, 2012; 7 pages.

The People's Republic of China; First Office Action, Notice and Search Report for Patent Application No. 201180032835.X; Oct. 8, 2014; 6 pages.

Japan Patent Office; Office Action and Search Report for Application No. 2013-518706; Feb. 3, 2015; 5 pages.

Taiwan Intellectual Property Office; Search Report for Application No. 100123366; May 14, 2015; 1 page.

The People's Republic of China; Second Office Action and Notice for Patent Application No. 201180032825.X; May 20, 2015; 5 pages.

\* cited by examiner

PULLING ROLLS FOR MAKING SHEET GLASS AND METHODS OF MAKING AND USING

CROSS-REFERENCE TO RELATED APPLICATIONS

This application is a divisional of U.S. patent application Ser. No. 12/829,685 filed on Jul. 2, 2010, the content of which is relied upon and incorporated herein by reference in its entirety, and the benefit of priority under 35 U.S.C. §120 is hereby claimed.

BACKGROUND

Field

The present disclosure relates to the manufacture of sheet glass. More particularly, the present disclosure relates to pulling rolls for use in the manufacture of sheet glass by, for example, the overflow downdraw fusion process.

Technical Background

Pulling rolls are used in the manufacture of sheet glass to apply tension to the ribbon of glass from which the sheets are formed and thus control the nominal sheet thickness. For example, in the overflow downdraw fusion process (see Dockerty, U.S. Pat. Nos. 3,338,696 and 3,682,609), pulling rolls are placed downstream of the tip or root of the fusion pipe and are used to adjust the rate at which the formed ribbon of glass leaves the pipe and thus determine the nominal thickness of the finished sheet.

Pulling rolls are preferably designed to contact the glass ribbon at its outer edges, specifically, in regions just inboard of the thickened beads that exist at the very edges of the ribbon. A preferred construction for such rolls employs discs of a heat resistant material, such as millboard, which are mounted on a driven shaft. Examples of this construction can be found in Moore, U.S. Pat. No. 3,334,010, Asaumi et al., U.S. Pat. No. 4,533,581, and Hart et al., U.S. Pat. No. 5,989,170, which are incorporated by reference in their entirety and for the specific purpose of describing examples of construction for pulling rolls.

A successful pulling roll can meet a number of conflicting criteria. The roll should be able to withstand the high temperatures associated with newly formed glass for substantial periods of time. The longer a roll can last in such an environment the better, since roll replacement reduces the amount of finished glass a given machine can produce and thus increases the ultimate cost of the glass.

The roll should be able to produce sufficient pulling force to control glass thickness. In order not to damage the central portion of the ribbon that becomes the usable finished glass, the roll can only contact the ribbon over a limited area at its edges. Thus, the required pulling forces must be generated using only this area. However, the forces applied to the glass cannot be too large since this can create surface damage which can propagate into the usable central portion of the ribbon. Accordingly, the roll should achieve a balance between applying too little and too much force to the edge regions of the glass.

Damage to the surface of the glass sheet can also be caused by the wear characteristics of the pulling roll material and whether it has been damaged by particles of glass embedded in the surface of the roll. Thus, the millboard material used in the construction of pulling rolls should also be hard enough to resist process damage due to broken glass during production for extended periods of time.

Additionally, the pulling roll should not give off excessive amounts of particles, which can adhere to the glass and form surface defects known as onclusions. For glass that is to be used in demanding applications, such as substrates for flat panel displays, onclusions must be kept to very low levels since each onclusion will typically represent a defective region of the finished product (e.g., one or more defective pixels). Because of the hot environment in which pulling rolls operate, providing materials that can apply sufficient pulling forces to a glass ribbon and yet not give off particles when hot is a difficult challenge.

Existing pulling rolls have not been able to fully satisfy the competing criteria of long high temperature life, controlled force application, hardness, and low contamination. Thus, there is a need in the art to obtain a pulling roll that achieves higher levels of such performance than existing pulling rolls.

SUMMARY

The present disclosure relates to pulling rolls for glass manufacture, and more particularly to a manner of preparing millboard materials used in the manufacture of pulling rolls. It is to be understood that various features of the invention disclosed in this specification and in the drawing can be used in any and all combinations. By way of non-limiting example the various features of the invention may be combined with one another as follows:

According to a first aspect, there is provided a pulling roll comprising a plurality of millboard pieces, wherein the plurality of millboard pieces have been fired at a predetermined temperature and time such that the pulling roll does not undergo a weight loss from thermal perturbations of more than 5% upon exposure to operating temperatures.

According to a second aspect, there is provided the pulling roll of aspect 1, wherein the plurality of millboard pieces have been fired prior to assembly of the pulling roll.

According to a third aspect, there is provided the pulling roll of aspect 1, wherein the predetermined temperature and time are such that the pulling roll does not undergo a weight loss from thermal perturbations of more than 3% upon exposure to operating temperatures.

According to a fourth aspect, there is provided the pulling roll of aspect 1, wherein the predetermined temperature and time are such that the pulling roll does not undergo a weight loss from thermal perturbations of more than 1% upon exposure to operating temperatures.

According to a fifth aspect, there is provided the pulling roll of any one of aspects 1-4, wherein the temperature and time are determined from a thermal profile of at least a portion of the plurality of millboard pieces.

According to a sixth aspect, there is provided the pulling roll of any one of aspects 1-5, wherein the plurality of millboard pieces have been fired at a temperature of at least about 750° C. for a period of at least about 4 hours.

According to a seventh aspect, there is provided the pulling roll of any one of aspects 1-5, wherein the plurality of millboard pieces have been fired at a temperature of at least about 900° C.

According to an eighth aspect, there is provided a method for manufacturing sheet glass, the method comprising forming a ribbon of glass using a fusion process including contacting at least a portion of the ribbon of glass with the pulling roll of any one of aspects 1-7, and then separating a sheet of glass from the ribbon of glass.

According to a ninth aspect, there is provided a method for preparing a pulling roll, the method comprising:

a. firing a plurality of millboard disks at a predetermined temperature and time, and b. assembling the plurality of millboard disks on a pulling roll shaft to form a pulling roll, wherein the predetermined temperature and time are such that the pulling roll does not undergo a weight loss from thermal perturbations of more than 5% upon exposure to operating temperatures.

According to a tenth aspect, there is provided the method of aspect 9, wherein the plurality of millboard disks are fired prior to assembly on a pulling roll shaft.

According to an eleventh aspect, there is provided the method of aspect 9 or aspect 10, wherein the predetermined temperature and time are such that the pulling roll does not undergo a weight loss from thermal perturbations of more than 3% upon exposure to operating temperatures.

According to a twelfth aspect, there is provided the method of aspect 9 or aspect 10, wherein the predetermined temperature and time are such that the pulling roll does not undergo a weight loss from thermal perturbations of more than 1% upon exposure to operating temperatures.

According to a thirteenth aspect, there is provided the method of any one of aspects 9-12, wherein comprises heating at a temperature of at least about 750° C.

According to a fourteenth aspect, there is provided the method of any one of aspects 9-13, wherein firing comprises heating at a first temperature and holding for a period of time, and then heating at a second temperature, wherein the second temperature is greater than the first.

According to a fifteenth aspect, there is provided the method of any one of aspects 9-14, comprising prior to step a, determining the thermal profile of the millboard disks over at least an intended operational temperature range of the pulling roll.

According to a sixteenth aspect, there is provided the method of any one of aspects 9-15, wherein the temperature is a temperature at which the plurality of millboard disks no longer lose weight from thermal perturbations upon exposure to the operational temperature range of the puling roll.

According to a seventeenth aspect, there is provided a method for determining a heating program for a millboard material, the method comprising:

a. monitoring the weight of a portion of the millboard material while heating at a furnace temperature of from about ambient to at least about a pulling roll operating temperature, and then b. determining the temperature and time at which the millboard material should be fired such that a pulling roll formed from the millboard material does not undergo a weight loss from thermal perturbations of more than 5% upon exposure to the operating temperature.

According to an eighteenth aspect, there is provided the method of aspect 17, wherein step b comprises determining the temperature and time at which the millboard material should be fired such that a pulling roll formed from the millboard material does not undergo a weight loss from thermal perturbations of more than 3% upon exposure to the operating temperature.

According to a nineteenth aspect, there is provided the method of aspect 17, wherein step b comprises determining the temperature and time at which the millboard material should be fired such that a pulling roll formed from the millboard material does not undergo a weight loss from thermal perturbations of more than 1% upon exposure to the operating temperature.

According to a twentieth aspect, there is provided the method of any one of aspects 17-19, further comprising firing a plurality of millboard pieces at the determined temperature and time.

According to a twenty first aspect, there is provided the method of any one of aspects 17-20, further comprising assembling the plurality of millboard pieces, after firing, to form a pulling roll.

According to a twenty second aspect, there is provided the method of any one of aspects 17-20, further comprising assembling the plurality of millboard pieces, prior to firing, to form a pulling roll and then firing the pulling roll at the temperature and for the time.

In still another aspect, the present disclosure provides a method for determining a heating program for a millboard material, the method comprising monitoring the weight of a portion of the millboard material while heating at about ambient to at a temperature higher than an expected pulling roll operating temperature (for example, for Nichias SD-115 material, such a temperature may be 1000° C. or higher), and then determining the temperature and time at which the millboard material should be fired such that a pulling roll formed from the millboard material does not undergo a weight loss from thermal perturbations of more than 5% upon exposure to the operating temperature.

Additional aspects of the disclosure will be set forth, in part, in the detailed description, drawings, and any claims that follow, and in part will be derived from the detailed description, or can be learned by practice of the disclosed exemplary embodiments. The advantages described below will be realized and attained by means of the elements and combinations particularly pointed out in the appended claims. It is to be understood that both the foregoing general description and the following detailed description are exemplary and explanatory only and are not restrictive of the disclosure.

BRIEF DESCRIPTION OF THE DRAWINGS

The accompanying drawing, is incorporated in and constitutes a part of this specification, illustrates certain aspects of the present invention and together with the description, serves to explain, without limitation, the principles of the invention.

DETAILED DESCRIPTION

The present disclosure can be understood more readily by reference to the following detailed description, drawing, examples, and claims, and their previous and following description. However, before the present articles and/or methods are disclosed and described, it is to be understood that this disclosure is not limited to the specific articles and/or methods disclosed unless otherwise specified, as such can, of course, vary. It is also to be understood that the terminology used herein is for the purpose of describing particular aspects only and is not intended to be limiting.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

The following description is provided as an enabling teaching of the disclosure in its currently known embodiment. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used herein, the singular forms "a," "an" and "the" include plural referents unless the context clearly dictates otherwise. Thus, for example, reference to a "disk" includes aspects having two or more such disks, unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, is based on the total weight of the composition in which the component is included.

As used herein, the term "weight loss" is intended to refer to a loss in weight of a millboard material and/or a pulling roll comprising a millboard material, the weight loss occurring as a result of thermal perturbations of the millboard material and/or pulling roll, for example, during use. Such weight loss is intended to include, but is not limited to weight loss resulting from the combustion and/or volatilization of components (for example, functional components and/or impurities) in the millboard material and/or pulling roll upon exposure to, for example, operating temperatures. Unless specifically stated to the contrary, the term "weight loss" is not intended to refer to weight loss occurring from purely mechanical perturbations, such as, for example, physical wear.

As used herein, the term "thermal profile" is intended to refer to the weight characteristics of a material upon exposure to either a fixed temperature for a specified time or a temperature gradient at a constant or varying rate. For example, a thermal profile can indicate at what temperature a material will lose weight, for example, due to combustion and/or volatilization, the rate of weight loss at a given temperature, and/or the time needed to reach a stable weight at a given temperature. The temperature or temperature range over which a thermal profile is obtained can vary depending upon, for example, the intended use of the material.

As briefly introduced above, the present disclosure provides a pulling roll that can, for example, significantly reduce onclusions in a sheet glass manufacturing process. The present disclosure also provides methods for preparing and using a pulling roll. In one aspect, the pulling roll of the present disclosure can exhibit a longer lifespan or operation time to failure, when compared to conventional pulling rolls. In another aspect, the inventive pulling roll can enable the production of glass with significantly fewer onclusions or defects than conventional pulling rolls. In various aspects, the methods of the present disclosure comprise firing a millboard material at a predetermined temperature and for a predetermined time so as to prevent weight loss due to thermal perturbations from occurring during use and/or exposure to operating temperatures.

It should be noted that even small changes in the level of onclusions can be significant in the production of sheet glass, such as, for example, that used in LCD displays.

A pulling roll, for use in the manufacture of sheet glass, can be produced from a millboard material, as described above. In one aspect, the millboard can be cut into pieces, fired, and the pieces then mounted on a shaft in face-to-face contact. The outer surface of each can form a portion of the exterior surface of the pulling roll. At least a portion of the exterior surface of the pulling roll can be adapted to contact the glass sheet. In another aspect, the portion of the pulling roll adapted to contact the glass sheet typically has a Shore D hardness at room temperature of between 30 and 60, preferably between 40 and 55.

It should be appreciated that a variety of pulling roll configurations exist in the literature and are suitable for use in the manufacture of sheet glass. U.S. Pat. No. 6,896,646 describes pulling rolls for glass sheet manufacture, and is incorporated by reference in its entirety and for the specific purpose of describing methods of producing a pulling roll from millboard materials. The present disclosure is not limited to a particular pulling roll configuration or arrangement, and one of skill in the art could readily choose an appropriate pulling roll configuration.

In a typical configuration, a pair of pulling rolls engage a glass sheet formed by an overflow downdraw process, wherein at least a portion of the outer surface of the pulling rolls contacts the glass sheet. A pulling roll can also include a shaft, which can carry a plurality of millboard pieces held in place by collars that can apply an axial compressive force to the millboard pieces when affixed to the shaft. An assembled pulling roll can include a bearing surface positioned on at least one end of the shaft. A pulling roll can also include a portion specifically adapted for contacting a glass sheet, wherein the exterior surface of the pulling roll at that portion extends a further distance from the shaft than does the surrounding portion of the pulling roll. Such a configuration can reduce the possibility of particles from the pulling roll becoming deposited on the glass sheet as onclusions.

The pulling roll of the present disclosure can comprise any millboard material suitable for use in forming a pulling roll. Millboard materials are often used as thermal insulation materials in various industries, including glass manufacture. Millboard articles are typically produced by creating a slurry of the desired components, using a rotating screened cylinder to effect uptake and dewatering of the components, transferring the dewatered components to a synthetic felt and then to an accumulator roll, where layers of the slurry are accumulated upon one another to a desired thickness. These accumulated layers can be slit, removed, and formed into flat sheets of desired dimensions for subsequent use. After and during forming, a millboard sheet can be compressed by rollers to give it a uniform thickness. The resulting millboard sheet can subsequently be heated to remove residual moisture. An example of a millboard making process that follows this technique is the Hatschek machine. U.S. Pat. Nos. 1,594,417, 1,678,345, 3,334,010, 4,487,631, and 5,989,170, describe various compositions and methods for millboard manufacture, and are incorporated by reference in their entirety and for the specific purpose of describing methods of manufacture for millboard articles. One of skill in the art could readily determine appropriate process conditions for the manufacture of a millboard article.

In one aspect, a pulling roll can comprise a commercially available millboard material, such as, for example, Nichias SD-115. In another aspect, a pulling roll can comprise a millboard comprised of an aluminosilicate refractory fiber, a silicate, a mica, a kaolin clay, and other optional functional components such as cellulose, starch, or silica. In still other aspects, a pulling roll can comprise a millboard material having a different composition than those specifically recited here, and the present invention is not intended to be limited to any particular millboard composition.

In one aspect, a millboard composition has a temperature resistance of greater than about 800° C., preferably greater than about 1,000° C.

The compressibility of a pulling roll is dependent upon the density of the millboard pieces from which the pulling roll is formed. It is desirable that a pulling roll, and thus the millboard material, exhibit low compressibility, for example, between about 15 and about 30 percent at 25° C., and/or less than about 5 percent at about 110° C. It is also desirable that a millboard material exhibit high recovery, for example, greater than about 30 percent, preferably greater than about 50 percent, and more preferably greater than about 60 percent. In one aspect, a millboard material has a recovery of at least about 30 percent, preferably at least about 50 percent, or more preferably at least about 60 percent at a high temperature, such as a temperature to which a pulling roll would be exposed during operation, for example, about 750° C. In a specific aspect, a millboard material has a recovery of at least about 50 percent at a temperature of at least about 750° C. Millboard materials possessing such recovery percentages can expand upon removal of the axial compressive force placed on a pulling roll or upon elongation of the pulling roll shaft as a result of thermal expansion, thus preventing separation of the millboard pieces that form the pulling roll.

Weight loss on a pulling roll, during operation, can occur from, for example, combustion and/or volatilization of components in the millboard material comprising the pulling roll which, in turn, may form onclusions in the glass produced with that pulling roll as the combustion and/or volatilization occurs. In one aspect, these combustible and/or volatile components can comprise functional materials, such as cellulose, that can be easily combusted in a firing step. Weight loss can be different from a change in composition or dimension. For example, weight loss can occur in a material without changing its composition and/or dimension when it is fired to 100° C. at which point any water present is driven off, but care must be taken after the material has been fired as it can regain water if humidity is present and can continue this absorption until an equilibrium is reached. Such weight loss can also result in separation of the disks of millboard material, especially when coupled with thermal expansion of the pulling roll shaft. Even relatively small weight losses can be significant in the performance and lifespan of a pulling roll. For example, a weight loss of about 1.5% during operation can be equivalent to about 4 disks of millboard material on a fully covered 65 inch pulling roll, about 7 disks of millboard material on a 98 inch pulling roll, and about 11 disks on a 143 inch pulling roll. It is also possible for a material to change in composition and/or dimension without a change in weight, for example, if a phase change has occurred at a particular temperature. For example, a change in crystal phase does not necessarily result in a weight change. Additionally, a composition and/or dimension change can occur without a change in weight when the material increases in shrinkage with an increase in temperature, reducing the volume occupied by the same weight, which also ahs the effect of increasing the density.

Determination of Firing Parameters

In various aspects, the methods of the present disclosure comprise firing a millboard material at a predetermined temperature and for a predetermined time so as to prevent weight loss due to thermal perturbations from occurring during use and/or exposure to operating temperatures.

In one aspect, the predetermined temperature and time are obtained from a thermal profile of the millboard material. In another aspect, the predetermined temperature and time are sufficient to prevent weight loss from thermal perturbations during use or exposure to operating temperatures. In yet another aspect, the predetermined temperature and time are such that the millboard material and/or a pulling roll made therefrom does not undergo a weight loss of more than 5% as a result of thermal perturbations upon exposure to operating temperatures. In still other aspects, the predetermined temperature and time are such that the millboard material and/or a pulling roll made therefrom does not undergo a weight loss of more than 4%, more than 3%, more than 2%, more than 1.5%, more than 1%, or more than 0.5%, as a result of thermal perturbations upon exposure to operating temperatures. In still other aspects, the percentage weight loss of a millboard material and/or a pulling roll made therefrom can vary, provided that glass produced from the pulling roll has a significantly reduced onclusion rate as compared to that produced from a conventional pulling roll.

In one aspect, the millboard material is fired prior to assembly of a pulling roll so that the millboard material exhibits substantially no weight loss when exposed to the temperatures at which the rolls (produced from those millboard pieces) operate.

In one aspect, the desired temperature and time for firing a millboard material can be determined by, for example, a thermal profile of the millboard material reflecting the weight loss of the material with respect to time and/or temperature. For example, one manner in which a thermal profile can be ascertained is through the use of thermogravimetric analysis, wherein the mass of a millboard material is monitored as it is subjected to a temperature gradient. Thermogravimetric analysis is an analytical technique that measures the weight loss (or weight gain) of a material as a function of temperature. As the material is heated, it can lose weight from drying, or from, for example, chemical reactions that liberate gasses. Some materials can gain weight by reacting with the atmosphere in the testing environment, such as a kiln. Since weight loss and gain can be disruptive processes to the material, knowledge of the magnitude and temperature range of those reactions can be useful in order to design appropriate thermal ramps for heating and hold temperatures during those reaction periods. Such a thermal profile can then be used to determine the temperature at which the millboard material no longer loses weight, up to, including, and beyond, for example, the intended operating temperature of the millboard material or pulling roll made therefrom. It is useful to know whether the material will loose weight at a temperature beyond the expected operating temperature, so that firing time and temperature can account for the event that temperature exceeds expected operating temperature. Another analytical technique that can be used to characterize the material as a function of temperature is differential thermal analysis. Differential thermal analysis is the measurement of the difference in temperature between a sample and a reference as heat is applied to the system. This method is sensitive to endothermic and exothermic processes including: phase transitions, dehydration, and decomposition, redox, or solid-state reactions. When a millboard material is heated in a differential thermal analysis, any phase changes that occur can be identified at the temperatures they occur. An understanding of any such phase changes, such as reactions in progress before the thermal profile is complete and those desirable at operating temperatures and beyond (even though no further weight loss is observed at a lower temperature), can be important.

Figure 1:
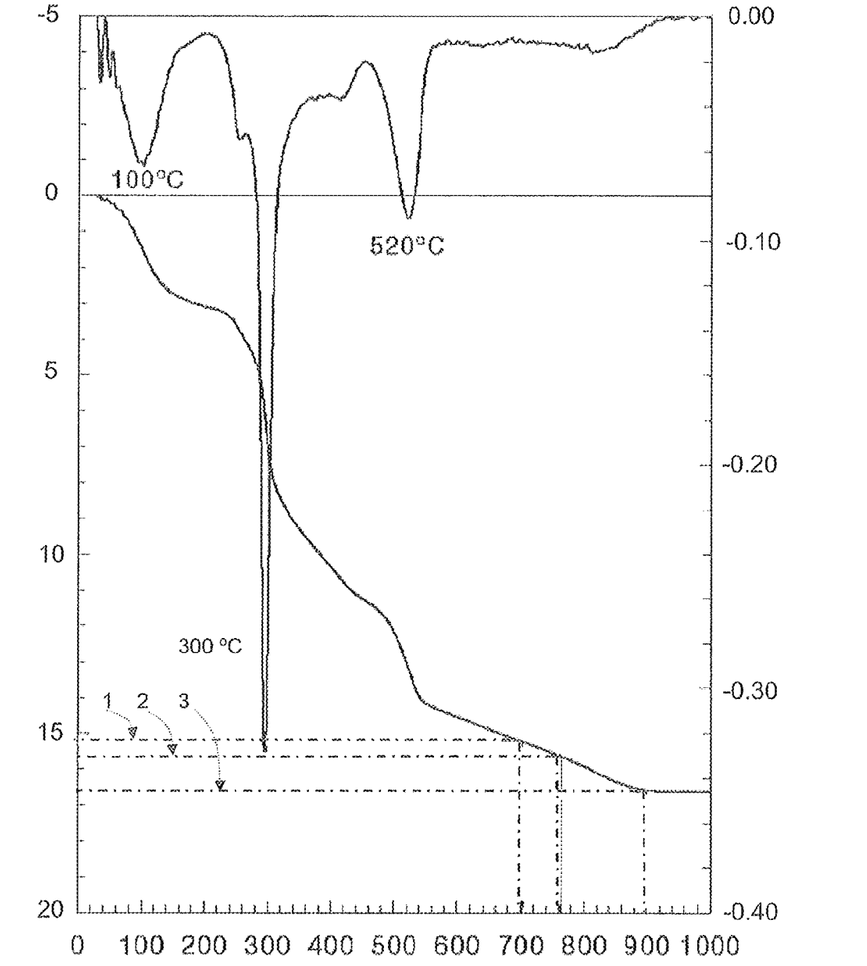
FIG. 1 is exemplary data from thermogravimetric analysis and differential thermal analysis of a millboard material. In the FIGURE, the x-axis represents temperature in ° C., left y-axis represents the percentage decrease in mass, the right y-axis axis represents the derivative or variation of mass/temperature. The top line in the FIGURE illustrates the derivate curve, as can be obtained by Differential Thermal Analysis, and the decreasing bottom curve illustrates the weight loss from Thermogravimetric Analysis.

In one aspect, the FIGURE shows the differential thermal analysis as the derivative curve. A reaction resulting in a phase change shows a dip in the curve at the temperature at which it occurs. For example, at 100° C., a dip occurs due to water being driven off. At 300° C., a dip occurs when organic components such as starch and cellulose are burned off. At 520° C., a dip occurs when the clay in the millboard reacts with other components.

In one aspect, a thermal profile can be acquired under the same or similar environmental conditions, for example, air or inert atmosphere, as can be expected during operation of a pulling roll.

In one aspect, a thermal profile can indicate the temperature(s) at which a millboard material loses weight, for example, due to combustion and/or volatilization of components within the millboard material. In another aspect, a thermal profile can indicate the rate of weight loss at a temperature or over a temperature range, or the time required to completely or substantially combust and/or volatilize components in the millboard material.

An exemplary thermal profile for a Nichias SD-115 millboard material is depicted in the FIGURE. As illustrated in the FIGURE, the millboard material loses weight over several distinct ranges around about 100° C., 300° C., and 520° C., and then gradually over the range of from about 550° C. to about 850° C. No further weight loss is apparent above about 900° C., as indicated by the flat line.

In one aspect, a thermal profile can be acquired over the temperature range from ambient up to (and beyond) about the operating temperature of a pulling roll. It should be noted that the operating temperature can vary, depending on, for example, the specific type and dimensions of glass being produced. In another aspect, a thermal profile can be acquired over a temperature range greater than the operating temperature of a pulling roll so as to account for otherwise unexpected increases in operating temperature. For example, if the intended operating temperature of a pulling roll is about 750° C., it may be advantageous to understand how the millboard material behaves upon exposure to temperatures greater than 750° C. In such an example, a millboard material may continue to lose weight up to about 800° C. Thus, firing of the millboard material at only 750° C. can, in various aspects, leave combustible and/or volatile material within the millboard material that can cause problems during unintended temperature variations (e.g., spikes) during operation.

In another exemplary aspect, a millboard material may lose weight only over a temperature range less than an intended operating temperature. For example, a pulling roll may have an intended operating temperature of about 1,000° C., but the millboard material comprising the pulling roll may only lose weight over the range of from about 650° C. to about 800° C. In such an example, firing the millboard material to the intended operating temperature of about 1,000° C. may be unnecessary and result in wasted energy, increased cost, and manufacturing time.

In one aspect, the predetermined temperature and time at which a millboard material should be fired is sufficient to prevent further weight loss due to thermal perturbations during use. In another aspect, the predetermined temperature and time at which a millboard material should be fired is the minimum temperature and time necessary to reach a stable weight, up to about the operating temperature. In one aspect, the temperature and time at which a millboard material should be fired can be determined by identifying the temperature at which only the minimally acceptable weight loss will occur upon exposure to operating temperatures. For example, with reference to the FIGURE, if the expected operating temperature is up to about 760° C., and if a weight loss of about 0.5% is acceptable, the millboard material can be fired at about 700° C. and held until no further weight loss occurs, i.e., there is a weight loss of about 0.5% between lines 1 (weight at 700° C.) and 2 (weight at 760° C.). Still with reference to the FIGURE, if a weight loss of less than 0.5% is required to prevent onclusions, and the operating temperature is again up to about 760° C. the millboard material should be fired at least at a temperature of about 760° C., preferably at a temperature higher than about 760° C. (as there is further weight loss above 760° C., and so as to account for unexpected temperature variance), further preferably at a temperature of about 900° C. (as there is a weight loss of about 1% from lines 2 to 3), and still further preferably at a temperature of about 1000° C., and held for a period of about 4-5 hours, i.e., from 900° C. to at least 1000° C. there is no further apparent weight loss. In such an example, the time at which a millboard material is fired can be determined from a thermal profile by varying the heating rate and/or heating at a fixed temperature to monitor weight loss with respect to time. In one aspect, the length of time at which a millboard material should be fired or held at a predetermined temperature can be dependent on the thermal mass of the millboard material.

Thus, in one aspect, the various methods of the present disclosure provide a mechanism to determine the desired firing time and temperature. In various aspects, these methods can provide improved pulling roll performance by eliminating problems resulting from weight loss during use, along with reduced waste of time and energy.

In one aspect, a millboard can be analyzed and/or subjected to temperatures that may be encountered during glass manufacture, such as, for example, from about 600° C. to about 1,000° C. or more.

Thus, in one aspect, the material weight loss behavior as a function of temperature, such as that shown by thermogravimetric analysis, can be understood prior to fabrication of the pulling roll.

It should be understood that the thermal profile and thus, the desired temperature and time for firing a millboard material can vary based on, for example, the millboard composition, impurities, specific production lot, and other environmental factors. It should also be understood that the thermal profile of a given millboard material can change over time. Thus, in one aspect, the thermal profile of each lot or type of millboard material advantageously can be ascertained prior to fabrication of a pulling roll.

Firing the Millboard Material

In one aspect, disks of millboard material are fired prior to assembly on a pulling roll. In one aspect, a millboard material can be fired (prior to assembly into a pulling roll) at a temperature and for a time sufficient to eliminate or minimize any further weight loss at the expected pulling-roll operating temperature. Firing at such a temperature and for such time will ensure that the pulling roll will not lose weight or bulk density once placed in production.

In an exemplary aspect, for Nichias SD-115, the millboard material can be fired at a temperature of at least about 900° C. and held for a period of time such that no further weight loss occurs. In one aspect, such a period of time can comprise at least about two hours, at least about 3 hours, at least about 4 hours, or at least about 5 hours. In a specific aspect, the period of time comprises at least about 4 hours.

In another aspect, the millboard material can be fired at a first temperature and held for a period of time, such that substantially all of the weight loss occurs. In an exemplary aspect, a millboard material can be fired at a temperature of from about 700° C. to about 760° C. and held for a period of time. In such an aspect, the millboard material can then be heated at a higher second temperature and held for a period of time. In an exemplary aspect, a second temperature can be at least about 800° C., at least about 900° C., or at least about 1,000° C. In still other aspects, firing can occur in a single step (e.g., heating by ramping furnace temperature directly at a single temperature) or in multiple steps (e.g., two or more steps wherein the material is fired at a first temperature and held for a period of time, then fired at a second temperature and held for a second period of time, and so forth).

The rate at which a millboard material (either as part of a pulling roll or before assembly into a pulling roll) is heated for a firing step can be any rate suitable for use in preparing the millboard material. In one aspect, the specific rate at which a millboard material is heated is not important, and any rate can be utilized. In another aspect, the rate at which a millboard material is heated can comprise any rate or combination of rates, provided that no or substantially no phase change occurs over the temperature range being used to fire the millboard material. If there is a phase change that occurs over the temperature range used to fire the millboard material, then it may be advantageous to hold the material at a particular temperature and for a particular time to allow the phase change to occur before heating at a higher temperature. In another aspect, the rate at which a millboard material can be heated can comprise any rate that provides sufficient time for the combustion and/or volatilization of components in the millboard material to occur. In such an aspect, the combustible and/or volatile components are removed and are not trapped within the millboard material where they could subsequently be combusted or volatilized during use. In various aspects, the millboard can be heated at a rate of from about 50° C./hr to about 150° C./hr, such as, for example, about 50, 55, 60, 65, 70, 75, 80, 85, 90, 95, 100, 105, 110, 115, 120, 125, 130, 135, 140, 145, or 150° C./hr; or from about 80° C./hr to about 120° C./hr, for example, about 80, 85, 90, 95, 100, 105, 110, 115, or 120° C. In yet another aspect, the millboard can be heated at a rate of about 100° C./hr. In other aspects, the millboard can be heated at a rate of less than about 50° C./hr or greater than about 150° C./hr, and the present disclosure is not intended to be limited to any particular heating rate.

After firing, the millboard material can be cooled or allowed to cool to a temperature at which it can be safely handled and/or placed on a pulling roll shaft.

Pulling Roll Construction

An appropriate number of fired millboard disks can be placed on a pulling roll shaft and pressed so that a locking mechanism, such as a collar with a set of snap rings, can be applied to hold the disks in compression. This pressed shaft can then be cut to desired dimensions prior to installation and use.

In one aspect, millboard material can be assembled into a pulling roll or portion thereof either prior to firing, after firing, or after partial firing, such that, for example, some weight loss can still occur due to thermal perturbations at operating temperatures. In another aspect, the millboard material can be fired prior to assembly such that no or substantially no weight loss due to thermal perturbations occurs during operation. If the pulling roll is first heated at a temperature within the operating range during operation, as opposed to heating until there is no weight change over the expected operating temperature range of the pulling roll, onclusion defects may be produced in the glass as material burns out of the pulling roll. Additionally, by firing the millboard material prior to fabrication of the pulling roll, material shrinkage will be eliminated, and the resulting pulling roll will maintain its bulk density and hardness. The resulting pulling roll will also exhibit longer life and be more resistant to damage from glass particles.

Pulling Roll Performance

In one aspect, a pulling roll formed with millboard material that has been fired in accordance with the various methods described herein, i.e., so that the millboard material does not change weight due to thermal considerations when heated at a temperature within the expected operating range of the pulling roll, can provide a significant reduction in the level of onclusions over conventional pulling rolls. In various aspect, such reductions can be up to about 30%, 40%, 50%, 60%, 70%, or more. In a specific aspect, a pulling roll prepared with millboard material that has been fired as described herein can provide, for example, a 68% reduction in onclusions.

In an exemplary aspect, an onclusion rate of about 6.5% when using a conventional pulling roll can be reduced to about 3.9% when using a pulling roll formed with millboard materials fired—as described herein—prior to assembly into the pulling roll. Depending on the specific location of a particular pulling roll, this level can be further reduced to about 2.0%.

For rolls placed in the highest position, i.e., closest to the point at which glass comes off of the forming device, where the operating temperature is the highest, the use of rolls formed as described in the present disclosure can, in various aspects, greatly reduce onclusions with respect to a conventional roll. In such an aspect, the disks on a conventional roll would lose weight and therefore produce particles and/or debris since the operating temperature can be higher than the temperature seen during fabrication. By firing disks at a temperature at which no further weight loss occurs, the likelihood of further weight loss and onclusions during use is reduced or eliminated for pulling rolls in the highest production position. Such a technique can also ensure that the fabricated pulling roll bulk density remains virtually unchanged, thereby extending roll life.

For rolls placed in lower positions, the operating temperature will be lower than for the higher positioned rolls, but still potentially higher than the temperature seen by conventional roll disks during fabrication. Pulling rolls produced according to the various methods of the present disclosure have the advantage, in one aspect, of not producing onclusions from combustion and/or volatilization of components in the millboard material. Such pulling rolls can also ensure that the fabricated roll bulk density remains virtually unchanged, extending roll life.

EXAMPLES

To further illustrate principles of the present disclosure, the following examples are put forth so as to provide those of ordinary skill in the art with a complete disclosure and description of how the millboard is prepared and how pulling rolls are made therefrom. They are intended to be purely exemplary of the disclosure and are not intended to limit the scope of what the inventor regards as his disclosure. Efforts have been made to ensure accuracy with respect to numbers (e.g., amounts, temperatures, etc.); however, some errors and deviations can occur. Unless indicated otherwise, temperature is ° C. or is at ambient temperature, and pressure is at or near atmospheric.

Example 1—Determination of Thermal Properties

In a first example, a commercially available millboard material (Nichias SD-115) was subjected to thermogravimetric analysis to determine the amount of weight loss that occurs over the projected operating temperature range of a pulling roll. As illustrated in the FIGURE, the millboard material lost weight when heated at a temperature of about 100° C., 300° C., and 520° C., with approximately 15.2 wt. % being lost over the furnace-temperature range of ambient to 700° C. Upon raising the furnace temperature from 700° C. to 900° C., the millboard material lost an additional 1.5 wt. %. Over a furnace temperature range of from 900° C. to 1,000° C., the millboard material exhibited no appreciable weight loss. Thus, the desired maximum firing temperature for this material is selected to be 900° C.

In such an example, if the millboard material were only fired at a temperature of about 700° C. and the pulling roll was exposed to an operating temperature of 760° C., then the weight loss would be 0.5% of its weight as shown in the FIGURE. If another pulling roll made from material was fired at a temperature of 700° C. and the pulling roll was exposed to an operating temperature of 900° C. or more, then the weight loss would be 1.5% of its weight as shown in the FIGURE. Such a weight loss can result in damage to the pulling roll and onclusions in the produced glass. In the latter case, the pulling rolls would be expected to produce three times as many onclusions as the former case pulling rolls.

In contrast, using the methods of the present disclosure, the millboard material can be fired at the highest temperature at which weight is lost, up to, and beyond, about the intended operating temperature, for example, about 900° C., and held until no further weight loss is observed, thus preventing weight loss during use.

Example 2—Firing of Millboard Material for a Pulling Roll

In a second example, a plurality of Nichias SD-115 millboard pieces suitable for forming a pulling roll can be subjected to a predetermined temperature program, based on the results obtained in Example 1.

The millboard material can be heated at a first temperature of about 760° C. by raising the furnace temperature from ambient at a heating rate of about 100° C./hr, and then held for a period of time. The millboard can subsequently be heated at a second temperature of about 900° C. and held for about 4.75 hrs, again, raising the temperature of the furnace at a rate of about 100° C./hr. The heated millboard material can then be allowed to cool slowly such that it can be handled and removed safely.

Example 3—Firing of Millboard Material for a Pulling Roll

In a third example, a plurality millboard pieces suitable for forming a pulling roll can be subjected to a predetermined temperature program, based on a previously acquired thermal profile that indicates that weight loss can occur over the temperature range of about 700° C. to 850° C. In such an example, a millboard material can be heated at a furnace temperature from ambient to about 900° C. and held for a period of time sufficient to prevent further weight change of more than 1% upon exposure to operating temperatures, for example, a sufficient time may be about 4 to 5 hours. After holding at 900° C. for 4 to 5 hours, the millboard material can be cooled or allowed to cool such that it can be handled.

Example 4—Reduction in Onclusions

In a fourth example, a pulling roll was manufactured with Nichias SD-115 millboard material that had been heated at about 900° C. for about 4 hours.

When such pulling rolls were installed in the #1 and #2 positions, the onclusion rate was about 3.9%, as compared to an average of about 6.5% for a conventional pulling roll. The #1 position is situated just below the tip or root of the fusion pipe and is used to establish the glass ribbon at the beginning of a production run or after a process upset which causes the ribbon to break upwards towards the tip or root of the fusion pipe. Rolls used in this position experience the hottest operating temperatures and the potential for onclusions is the greatest if the firing temperature of the material is below these operating temperatures. If the rolls are fired at a temperature at which no weight loss occurs, they will not change in bulk density upon installation and will not wear as quickly as rolls fired to lower temperatures, so the potential for onclusions as a result of roll wear to establish the glass ribbon is much lower. The #2 position is situated just below the #1 position and once the glass ribbon is established with the rolls in the #1 position they are placed on the ribbon but contact the glass outside the usable central portion of the ribbon and so are used for pulling the ribbon through the process. Rolls used in this position experience lower operating temperatures than those used in the #1 position, but there is still the potential for onclusions if the firing temperature of the material is below these operating temperatures. Also, since these rolls contact the glass during production of usable glass sheet any onclusions produced from roll wear can cause the rejection of manufactured glass sheets. If the rolls are fired at a temperature at which no weight loss occurs, they will not change in bulk density upon installation and will not wear as quickly as rolls fired at lower temperatures, so the potential for onclusions as a result of roll wear is much lower.

This performance was improved by reducing the onclusion level to about 2.0% when such pulling rolls were installed in the #4 position. The #4 position (and lower positions) is situated well below the rolls in the #2 position and are generally used to guide instead of pull the glass ribbon. Rolls in this position (and lower positions) experience much lower operating temperatures that are generally below the firing temperature; however, onclusions from roll wear can remain a concern. If the rolls are fired at a temperature at which no weight loss occurs, they should not change in bulk density upon installation and will not wear as quickly as rolls fired at lower temperatures. Thus, the potential for onclusions as a result of roll wear is much lower.

The pulling rolls made according to the concepts discussed herein can achieve an improvement in pulling roll lifetime of about 30-60 days.

Throughout this application, various publications are referenced. The disclosures of these publications in their entireties are hereby incorporated by reference into this application in order to more fully describe the compounds, compositions and methods described herein.

Various modifications and variations can be made to the concepts, compounds, compositions and methods described herein. Other aspects of the concepts, compounds, compositions and methods described herein will be apparent from consideration of the specification and practice of the concepts, compounds, compositions and methods disclosed herein. It is intended that the specification and examples be considered as exemplary.

What is claimed is:

1. A method of making a pulling roll, comprising the steps:
   a. conducting at least one of a thermogravimetric analysis (TGA) and a differential thermal analysis (DTA) of millboard disks from ambient temperature to an upper thermal profile temperature that is higher than a pulling roll operating temperature, wherein the pulling roll operating temperature is 1000° C. or greater;
   b. selecting a firing temperature and time for the disks based on the at least one of a TGA and a DTA such that the disks do not undergo a weight loss from thermal perturbations of more than 5% upon exposure to the pulling roll operating temperature;
   c. firing a plurality of the millboard disks at the firing temperature and time; and
   d. assembling the plurality of millboard disks on a pulling roll shaft to form a pulling roll, the assembling conducted after the firing step.

2. The method of claim 1, wherein the selecting a firing temperature and time for the disks is conducted such that the disks exhibit substantially no weight loss from thermal perturbations upon exposure to the pulling roll operating temperature.

3. The method of claim 1, wherein the millboard disks have a millboard composition that comprises a refractory fiber, a mica and a clay, the firing temperature is at least 900° C. and the firing time is at least 4 hours.

4. The method of claim 1, wherein the firing temperature is set below the upper profile temperature and the operating temperature, and above a minimum temperature in which the disks exhibit substantially no weight loss during the conducting at least one of a TGA and a DTA.

5. The method of claim 1, wherein the firing temperature is set at or above the upper profile temperature.

6. The method of claim 5, wherein the firing temperature is set at 50° C. higher than the upper profile temperature.

7. A method of making pulling roll disks, comprising the steps:
   a. conducting at least one of a thermogravimetric analysis (TGA) and a differential thermal analysis (DTA) of millboard disks from ambient temperature to an upper thermal profile temperature that is higher than a pulling roll operating temperature, wherein the pulling roll operating temperature is 1000° C. or greater;
   b. selecting a firing temperature and time for the disks based on the at least one of a TGA and a DTA such that the disks do not undergo a weight loss from thermal perturbations of more than 5% upon exposure to an expected pulling roll operating temperature; and
   firing a plurality of the millboard disks at the firing temperature and time.

8. The method of claim 7, wherein the selecting a firing temperature and time for the disks is conducted such that the disks exhibit substantially no weight loss from thermal perturbations upon exposure to the pulling roll operating temperature.

9. The method of claim 7, wherein the millboard disks have a millboard composition that comprises a refractory fiber, a mica and a clay, the firing temperature is about 900° C. and the firing time is at least 4 hours.

10. The method of claim 7, wherein the firing temperature is set below the upper profile temperature and the operating temperature, and above a minimum temperature in which the disks exhibit substantially no weight loss during the conducting at least one of a TGA and a DTA.

11. The method of claim 7, wherein the firing temperature is set at or above the upper profile temperature.

12. The method of claim 11, wherein the firing temperature is set at 50° C. higher than the upper profile temperature.

* * * * *